US009706483B2

United States Patent
Ko et al.

(10) Patent No.: US 9,706,483 B2
(45) Date of Patent: Jul. 11, 2017

(54) APPARATUS AND METHOD FOR ACCESSING WIRELESS NETWORK

(71) Applicant: SAMSUNG SDS CO., LTD., Seoul (KR)

(72) Inventors: You Chang Ko, Seoul (KR); Yang Hwan Joe, Goyang-Si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 144 days.

(21) Appl. No.: 14/585,903

(22) Filed: Dec. 30, 2014

(65) Prior Publication Data

US 2015/0139032 A1    May 21, 2015

Related U.S. Application Data

(63) Continuation of application No. PCT/KR2013/006004, filed on Jul. 5, 2013.

(30) Foreign Application Priority Data

Jul. 12, 2012    (KR) .................. 10-2012-0076138

(51) Int. Cl.
*H04L 12/28* (2006.01)
*H04W 48/16* (2009.01)
*H04W 48/18* (2009.01)
*H04W 72/02* (2009.01)

(52) U.S. Cl.
CPC ........... *H04W 48/16* (2013.01); *H04W 48/18* (2013.01); *H04W 72/02* (2013.01)

(58) Field of Classification Search
CPC . H04W 28/0215; H04W 36/00; H04W 36/34; H04W 36/36; H04W 48/00; H04W 48/02; H04W 48/04; H04W 48/06; H04W 48/08; H04W 48/10; H04W 48/12; H04W 48/14; H04W 48/16; H04W 48/17; H04W 48/18; H04W 48/20
See application file for complete search history.

(56) References Cited

U.S. PATENT DOCUMENTS

2008/0198811 A1*    8/2008    Deshpande ........... H04W 48/16
                                                    370/332

FOREIGN PATENT DOCUMENTS

KR    1020110008462 A    1/2011

OTHER PUBLICATIONS

Communication dated Apr. 21, 2015, issued by the Korean Intellectual Property Office in counterpart Korean Application No. 10-2015-0028948.

* cited by examiner

*Primary Examiner* — Afshawn Towfighi
(74) *Attorney, Agent, or Firm* — Sughrue Mion, PLLC (57) ABSTRACT

An apparatus for accessing a wireless network includes an access manager configured to request access to a wireless network according to a wireless network access condition including at least one desired service set identifier (SSID); and a wireless network access module configured to search for at least one wireless network corresponding to the at least one desired SSID, and access the searched at least one wireless network.

20 Claims, 6 Drawing Sheets

APPARATUS AND METHOD FOR ACCESSING WIRELESS NETWORK

CROSS-REFERENCE TO RELATED APPLICATIONS

This application is a Continuation Application of International Application PCT/KR2013/006004 filed on Jul. 5, 2013, which claims benefit of Korean Patent Application No. 10-2012-0076138 filed on Jul. 12, 2012, in the Korean Intellectual Property Office, the disclosures of which are incorporated herein in their entireties by reference.

TECHNICAL FIELD

Exemplary embodiments of the present invention relate to a technology for a device capable of accessing multiple radio frequency bands to access a wireless network in consideration of a radio frequency band, and more particularly, to an apparatus and method for accessing a wireless network.

BACKGROUND ART

With an increase in the use of wireless networks, radio frequency bands used by the wireless networks are also diversifying. For example, in the case of a wireless local area network (LAN), the 5 GHz band is currently used together with the existing 2.4 GHz band, and accordingly, devices supporting a wireless LAN are being developed as multi-band devices capable of simultaneously handling the 2.4 GHz band and the 5 GHz band.

Such a multi-band device generally performs wireless network access to arbitrary one of radio frequency bands usable by a terminal. However, according to characteristics of a service to be used by a user, the use of a specific frequency band may be more advantageous than the use of an arbitrary frequency band. For example, in a voice over Internet protocol (VoIP) service, etc., the 2.4 GHz band is much more advantageous than the 5 GHz band due to the straightness, diffraction, transmissivity, etc. of a frequency. However, in the case of an existing device, it is not possible to select an appropriate frequency according to a service even when the use of a specific frequency band is more advantageous than the use of an arbitrary frequency band.

DISCLOSURE

Technical Problem

The present invention is directed to providing a wireless network accessing means capable of selectively accessing an appropriate frequency band according to the type of a service to be used, characteristics of a local wireless network, and so on.

Technical Solution

According to an aspect of the present invention, there is provided an apparatus for accessing a wireless network, the apparatus including: an access manager configured to request access to a wireless network according to a wireless network access condition including one or more desired service set identifiers (SSIDs); and a wireless network access module configured to search for wireless networks, and access a wireless network having a desired SSID when there is the wireless network having the desired SSID among wireless networks found as a result of the search.

According to another aspect of the present invention, there is provided an apparatus for accessing a wireless network, the apparatus including: a wireless network access module configured to search for wireless networks and access one of found wireless networks; a policy download module configured to download a wireless network access policy via the accessed wireless network; and an access manager configured to compare the downloaded wireless network access policy with information on the currently accessed wireless network, and terminate access to the currently accessed wireless network and request access to a wireless network in accord with the access policy when it is determined that the currently accessed wireless network is not in accord with the wireless network access policy. The wireless network access module is configured to perform access to the wireless network requested by the access manager.

According to another aspect of the present invention, there is provided a method for accessing a wireless network, the method including: requesting, by an access manager, access to a wireless network according to a wireless network access condition including one or more desired SSIDs; and searching for, by a wireless network access module, wireless networks, and accessing a wireless network having a desired SSID when there is the wireless network having the desired SSID among wireless networks found as a result of the search.

According to another aspect of the present invention, there is provided a method for accessing a wireless network, the method including: searching for, by a wireless network access module, wireless networks and accessing one of found wireless networks; downloading, by a policy download module, a wireless network access policy via the accessed wireless network; comparing, by an access manager, the downloaded wireless network access policy with information on the currently accessed wireless network, and terminating access to the currently accessed wireless network and requesting access to a wireless network in accord with the access policy when it is determined that the currently accessed wireless network is not in accord with the wireless network access policy; and performing, by the wireless network access module, access to the wireless network requested by the access manager.

Advantageous Effects

According to exemplary embodiments of the present invention, a device capable of accessing multiple radio frequency bands can selectively access an appropriate frequency band according to various conditions, such as the type of a service to be used, characteristics of a local wireless network, and so on.

MODE FOR INTENTION

Hereinafter, embodiments of the present invention will be described in detail with reference to the accompanying drawings. However, the embodiments are for illustrative purposes only, and the present invention is not limited thereto.

In describing the present invention, any detailed description of related art of the invention will be omitted if it is deemed that such a description will obscure the gist of the invention unintentionally. In addition, terms described below are defined in consideration of functions in the present invention, which may be changed according to the intention, practice, etc. of a user or an operator. Therefore, the definitions of these terms should be made, based on the overall description of this specification.

The technical idea of the present invention is determined by the claims, and the exemplary embodiments are provided so that the technical idea of the present invention will be efficiently explained to those of ordinary skill in the art to which the present invention pertains.

Figure 1:
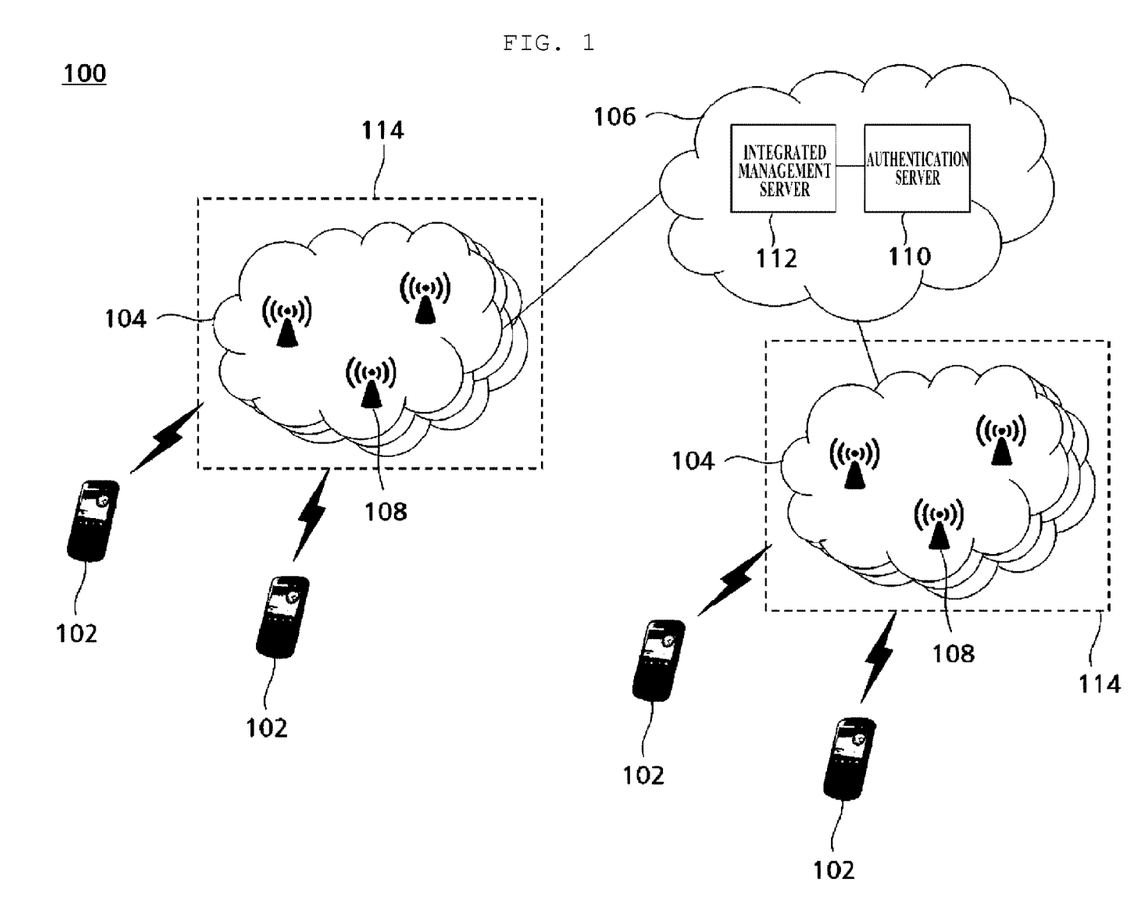
FIG. 1 is a block diagram of a wireless network access system 100 according to exemplary embodiments of the present invention.

FIG. 1 is a block diagram of a wireless network access system according to exemplary embodiments of the present invention. As shown in the drawing, a wireless network access system 100 according to exemplary embodiments of the present invention includes one or more wireless network access apparatuses 102, one or more wireless networks 104, and a backend system 106.

The wireless network access apparatuses 102 are intended to access the wireless networks 104 and transmit and receive data. In exemplary embodiments of the present invention, each wireless network access apparatus 102 may access a radio frequency band selected from among a plurality of radio frequency bands. For example, each wireless network access apparatus 102 may be a dual-band terminal capable of selectively accessing any one radio frequency band between the 2.4 GHz band and the 5 GHz band.

Each wireless network access apparatus 102 may access any one of accessible radio frequency bands according to a previously set access condition or access policy. Here, the access condition or the access policy may be directly input by a user of the wireless network access apparatus 102, programmed and stored in advance in an access manager operating in the wireless network access apparatus 102, or downloaded from the backend system 106, which will be described later, upon access to a wireless network 104.

The wireless networks 104 are accessed by the wireless network access apparatuses 102. The wireless networks have service set identifiers (SSIDs) and are distinguished from each other with the SSIDs. As shown in the drawing, the one or more wireless networks 104 constitute one wireless network service area 114. In other words, the one wireless network service area 14 includes the one or more wireless networks 104, and each wireless network access apparatus 102 is configured to access one wireless network selected from among the one or more wireless networks 104 present in the wireless network service area 114. In exemplary embodiments of the present invention, the wireless network service area 114 denotes a physical place in which a wireless network service is provided. For example, a workplace, a factory, etc. of a company, etc. in a specific location may be constitute the one wireless network service area 114. In the wireless network service area 114, the one or more wireless networks 104 distinguished with the aforementioned SSIDs may be served.

The one wireless network service area 114 includes one or more wireless access points (APs) 108. Therefore, the respective wireless APs 108 provide the wireless network service using the one or more corresponding SSIDs, and each wireless network 104 may be served in one or more radio frequency bands according to a purpose thereof. For example, each wireless network 104 may be served in the single 2.4 GHz band, the single 5 GHz band, or the mixed 2.4 GHz/5 GHz band. Each wireless network access apparatus 102 may select an access SSID and a wireless frequency band due to a user, an access manager operating in the wireless network access apparatus 102, or a policy of an integrated management server 112 in the backend system 106, and perform access.

The backend system 106 is intended to manage the wireless network access apparatuses 102 accessing the wireless networks 104, and includes an authentication server 110 and the integrated management server 112.

The authentication server 110 receives authentication information (user IDs, passwords, the media access control (MAC) addresses of the wireless network access apparatuses 102, etc.) from the wireless network access apparatuses 102 accessing the wireless networks 104, and authenticates users and the wireless network access apparatuses 102 according to the received authentication information.

The integrated management server 112 establishes the access policy of a user and a wireless network access apparatus 102 authenticated by the authentication server 110, and transmits the access policy to an access manager of the wireless network access apparatus 102. Specifically, the integrated management server 112 generates the access policy of the wireless network access apparatus 102 according to user information (an ID, a password, etc.) of the wireless network access apparatus 102, unique information (a MAC address, a serial number, etc.) of the wireless network access apparatus 102, the accessed wireless network service area 114, the SSID of a wireless network 104, an access time, etc., and transfers the access policy to the access manager of the wireless network access apparatus 102. However, according to exemplary embodiments, a case in which an access policy is stored in the wireless network access apparatus 102 in advance, a case in which an access policy is directly input by the user, and a case of downloading an access policy from the integrated management server 112 may be used separately or in an integrated manner. Also, the exemplary embodiment shows that the authentication server 110 and the integrated management server 112 are configured as separate servers, but the authentication server 110 may be included in the integrated management server 112 as a component of the integrated management server 112. In this case, when user authentication is performed by the access manager of the wireless network access apparatus 102, the integrated management server 112 may provide an access policy corresponding to the wireless network access apparatus 102 to the wireless network access apparatus 102 together with a result of the authentication.

Figure 2:
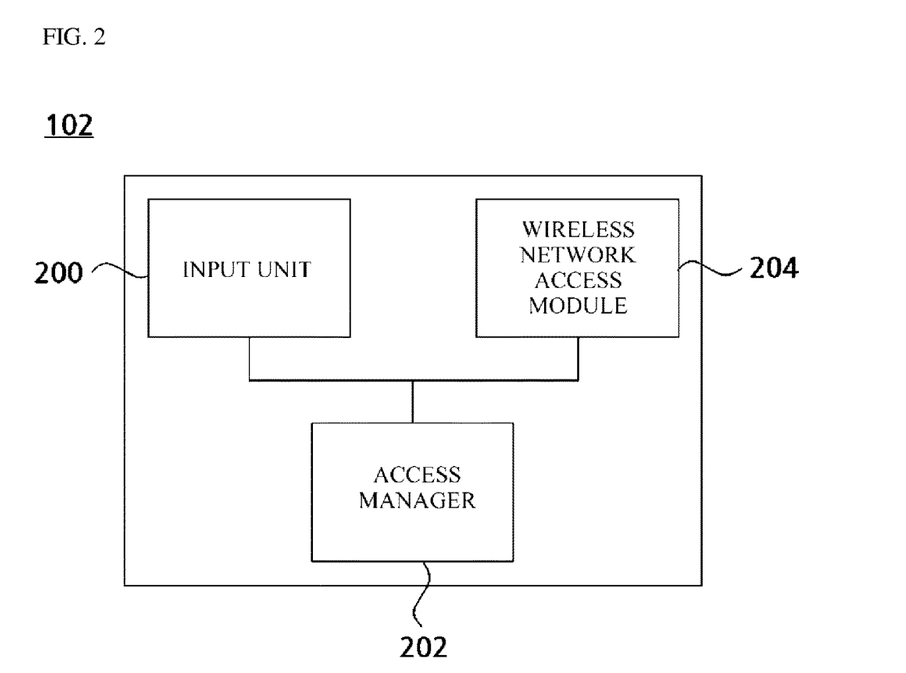
FIG. 2 is a block diagram of an apparatus for accessing a wireless network 102 according to a first exemplary embodiment of the present invention.

FIG. 2 is a block diagram of an apparatus for accessing a wireless network according to a first exemplary embodiment of the present invention. As shown in the drawing, a wireless network access apparatus 102 according to the first exemplary embodiment of the present invention includes an input unit 200, an access manager 202, and a wireless network access module 204. However, these are functional classifications of the wireless network access apparatus 102, and for example, the input unit 200 may be implemented as a function of the access manager 202. In an exemplary embodiment, one or more of the input unit 200, the access manager 202, and the wireless network access module are implemented via at least one central processing unit (CPU) or at least one hardware processor.

The input unit 200 receives access condition information of a wireless network from a user. Here, the access condition information may include only SSID information of a desired wireless network, or include frequency band information mapped according to desired SSIDs. For example, the access condition information input by the user may be that it is necessary to access, for example, a wireless network having the SSID "SSID_1" using 2.4 GHz and a wireless network having the SSID "SSID_2" using 5 GHz. The input unit 200 may receive such access condition information together with user information (an ID, a password, etc.) or through a menu other than a user information input menu.

The access manager 202 requests wireless network access from the wireless network access module 204 according to the access condition information input from the input unit 200. Specifically, the access manager 202 transfers information, such as user information input from the input unit 200, unique information of the wireless network access apparatus 102 (a MAC address, a serial number, a model number, etc.), input frequency band information, SSID information, and authentication method information, to the wireless network access module 204, and requests the wireless network access module 204 to access a wireless network according to the transmitted information.

The wireless network access module 204 searches for wireless networks according to the access request, and accesses a wireless network in accord with the access condition information when the wireless network in accord with the access condition information is found. The wireless network access module 204 may include therein a wireless communication modem and a controller for controlling the wireless communication modem. Technological details related to the wireless communication modem and the controller are well known to those or ordinary skill in the art, and the detailed description thereof will be omitted herein.

Specifically, the wireless network access module 204 sets the wireless channel scanning method of the wireless communication modem with reference to the frequency band information among the pieces of access condition information received from the access manager 202. For example, when the frequency band is the 2.4 GHz band or the 5 GHz band, the wireless communication modem is set to scan a channel of the frequency band only. Accordingly, the wireless communication modem determines whether or not there is a wireless channel of a frequency band set for an SSID included in the access condition information, and accesses the appropriate wireless channel when the appropriate wireless channel is found.

When access to a wireless network 104 is completed through such a process, the wireless network access module 204 feeds the SSID and a frequency band of the accessed wireless network 104 and information about whether or not the access has succeeded back to the access manager 202.

Then, the access manager 202 stores information on the currently accessed frequency band and SSID. When the wireless network access to the set radio frequency band fails, the access manager 202 shows an appropriate feedback message to the user, thereby causing the user to make a reset.

Subsequently, when the user requests information on the currently accessed wireless network 104 through the access manager 202, the access manager 202 may display the stored information on the SSID and the frequency band to the user.

Meanwhile, the user may request the access manager 202 to log out from a currently accessed wireless network. In this case, the access manager 202 requested to log out by the user requests the wireless network access module 204 to terminate the access to the currently accessed wireless network, and simultaneously requests the wireless network access module 204 to configure a frequency band setting as default access, that is, a state in which it is possible to access all accessible frequency bands regardless of frequency bands. Accordingly, the wireless network access module 204 terminates the current access through the wireless communication modem and switches the frequency band setting to default access.

Even if there is not an explicit logout request from the user, when a state change, such as a signal interruption, is sensed from the currently accessed SSID through the wireless communication modem, the wireless network access module 204 notifies the access manager 202 of the state change. The access manager 202 notified of the state change determines whether or not the wireless network in which a signal has been interrupted satisfies the following two conditions. When the wireless network satisfies the two conditions, the access manager 202 considers that the access to the SSID has been terminated and switches the frequency band setting of the wireless network access module 204 to default access.

1) The frequency band of an SSID whose signal has been interrupted is set to a specific wireless frequency band other than default access.

2) A signal interruption state lasts for a predetermined time td ($>0$). In this case, the value of td may be appropriately determined in consideration of characteristics of the network, and so on.

Figure 3:
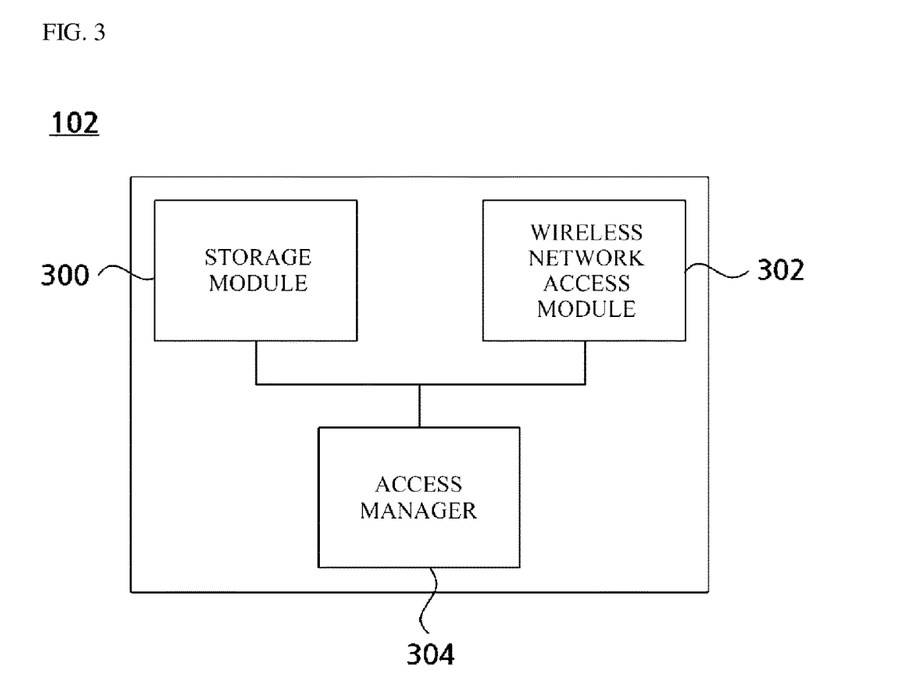
FIG. 3 is a block diagram of an apparatus for accessing a wireless network 102 according to a second exemplary embodiment of the present invention.

FIG. 3 is a block diagram of an apparatus for accessing a wireless network according to a second exemplary embodiment of the present invention. As shown in the drawing, a wireless network access apparatus 102 according to the second exemplary embodiment of the present invention includes a storage module 300, a wireless network access module 302, and an access manager 304. In an exemplary embodiment, one or more of the storage module 300, the wireless network access module 302, and the access manager 304 are implemented via at least one central processing unit (CPU) or at least one hardware processor.

The storage module 300 stores access condition information of a wireless network that the wireless network access apparatus 102 wants to access. In other words, this exemplary embodiment differs from the first exemplary embodiment in that the access condition information of a wireless network is stored in the wireless network access apparatus 102 in advance. Here, the wireless network access condition information may include at least one piece of information among the SSID of the desired wireless network, identification information (e.g., MAC address information) of respective APs in an SSID, SSID-specific accessible radio frequency bands or accessible radio frequency bands according to identification information of the respective APs in the same SSID, and SSID-specific access priority orders. The wireless network access condition information may be determined and hard-coded during the manufacturing of the access manager 304 or manually set by a user and stored in the storage module 300, or the access policy of the integrated management server 112 may be downloaded and stored in the storage module 300 as the wireless network access condition information.

The wireless network access module 302 searches for wireless networks according to set periods or a request of the access manager 304, etc., and transfers information on found wireless networks to the access manager 304. Here, the wireless network information may include the SSIDs of the found wireless networks and identification information of APs in the SSIDs.

The access manager 304 compares the information on the wireless networks found by the wireless network access module 302 with the access condition information stored in the storage module 300. When there is a wireless network in accord with access conditions, the access manager 304 requests the wireless network access module 302 to access the wireless network.

When the access condition information includes only the SSID of a desired wireless network, the access manager 304 determines whether or not there is a wireless network in accord with the SSID included in the access condition information among the found wireless networks. When there is a wireless network in accord with the SSID, the access manager 304 requests the wireless network access module 302 to access the wireless network. On the other hand, when radio frequency band information is mapped to SSIDs and stored in the storage module 300, the access manager 304 scans the frequency bands for an SSID in accord with the access conditions. When there is a wireless channel in accord with both the SSID and a radio frequency band, the access manager 304 requests the wireless network access module 302 to access the wireless channel. As another example, when radio frequency band information is mapped to identification information of APs using the same SSID and stored in the storage module 300, the access manager 304 scans the frequency bands for an SSID and an AP in accord with the access conditions. When there is a wireless channel in accord with a radio frequency band, the access manager 304 requests the wireless network access module 302 to access the wireless channel. Also, when there are a plurality of wireless networks satisfying the access conditions, the access manager 304 requests access to a wireless network having the highest priority order with reference to the access priority orders included in the access condition information.

The wireless network access module 302 receiving the request accesses the wireless network as requested. Specifically, the wireless network access module 302 sets the wireless channel scanning method of a wireless communication modem with reference to frequency band selection information among pieces of information received from the access manager 304, and requests user authentication from the authentication server 110. Subsequently, when the authentication is completed and access to a wireless network 104 is completed, the wireless network access module 302 feeds the SSID of an accessed wireless channel, AP information (e.g., MAC address), a frequency band, and information about whether or not the access has succeeded back to the access manager 304. Then, the access manager 304 stores information on a currently accessed frequency band and SSID.

Subsequently, when the user requests information on the currently accessed wireless network through the access manager 304, the access manager 304 may display the stored information on the SSID and the frequency band to the user.

Meanwhile, the user may request the access manager 304 to log out from a currently accessed wireless network. In this case, the access manager 304 requested to log out by the user requests the wireless network access module 302 to terminate the access to the currently accessed wireless network and simultaneously requests the wireless network access module 302 to configure a frequency band setting as default access, that is, a state in which it is possible to access all accessible frequency bands regardless of frequency bands. Accordingly, the wireless network access module 302 terminates the current access through the wireless communication modem and switches the frequency band setting to default access.

Even if there is not an explicit logout request from the user, when a state change, such as a signal interruption, is sensed from the currently accessed SSID through the wireless communication modem, the wireless network access module 302 notifies the access manager 304 of the state change. The access manager 304 notified of the state change determines whether or not the wireless network in which a signal has been interrupted satisfies the following two conditions. When the wireless network satisfies the two conditions, the access manager 304 considers that the access to the SSID has been terminated and switches the frequency band setting of the wireless network access module 302 to default access.

1) The frequency band of an SSID whose signal has been interrupted is set to a specific wireless frequency band other than default access.

2) A signal interruption state lasts for a predetermined time td ($>0$). In this case, the value of td may be appropriately determined in consideration of characteristics of the network, and so on.

Figure 4:
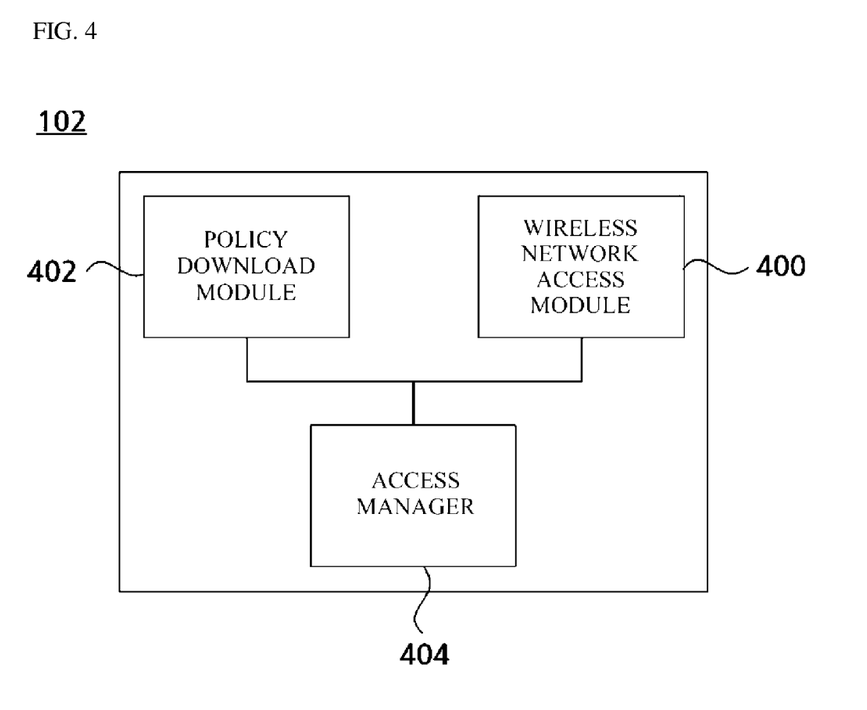
FIG. 4 is a block diagram of an apparatus for accessing a wireless network 102 according to a third exemplary embodiment of the present invention.

FIG. 4 is a block diagram of an apparatus for accessing a wireless network according to a third exemplary embodiment of the present invention. As shown in the drawing, a wireless network access apparatus 102 according to the third exemplary embodiment of the present invention includes a wireless network access module 400, a policy download module 402, and an access manager 404. However, these are functional classifications of the wireless network access apparatus 102, and for example, the policy download module 402 may be implemented as a part of the access manager 404. In an exemplary embodiment, one or more of the wireless network access module 400, the policy download module 402, and the access manager 404 are implemented via at least one central processing unit (CPU) or at least one hardware processor.

The wireless network access module 400 searches for wireless networks, and accesses a found wireless network.

The policy download module 402 downloads an access policy of the accessed wireless network via the wireless network. Here, the access policy includes at least one among the SSIDs of wireless networks accessible by the wireless network access apparatus 102, SSID-specific accessible frequency bands, and SSID-specific access priority orders.

Details of a wireless network access process of the wireless network access module 400 and an access policy download process of the policy download module 402 are as follows. First, the wireless network access module 400 sets a wireless channel with an AP belonging to a wireless network 104 of a wireless network service area 114 in which the wireless network access apparatus 102 is located, and requests user authentication from the authentication server 110 via the AP. Then, the authentication server 110 performs authentication using authentication parameters, such as an ID and a password, received from the wireless network access module 400, and returns an authentication result.

When the authentication is completed through the above process, the policy download module 402 transfers user information (the ID, the password, etc.), unique information (a MAC address, a serial number, a model number, etc.) of the wireless network access apparatus 102, information on the SSID and a frequency band of the currently accessed wireless network 104, wireless network service area information, access time information, etc. to the integrated management server 112 via the currently accessed wireless network 104.

Then, the integrated management server 112 authenticates the wireless network access apparatus 102 according to the received information. When the authentication succeeds, the integrated management server 112 generates an access policy corresponding to the wireless network access apparatus 102 and transmits the access policy to the wireless network access apparatus 102. The policy download module 402 receives and stores the access policy received from the integrated management server 112.

The access policy includes the SSIDs and access frequency bands of wireless networks accessible by the wireless network access apparatus 102, and SSID-specific access priority information. In other words, the integrated management server 112 sets the access policy of the wireless network access apparatus 102 based on information that is a combination of one or more pieces of information among the user information of the wireless network access apparatus 102, the unique information of the wireless network access apparatus 102, information on the wireless network service area 114, information (SSID) of the currently accessed wireless network 104, the access time information, and so on. For example, the access policy may be configured to use different SSIDs and radio frequency bands according to a user of the wireless network access apparatus 102, a network access time, an access location, SSID information, or an application to be used.

The access manager 404 compares the downloaded access policy with information (radio frequency band information and the SSID) on the currently accessed wireless network 104. When it is determined that the accessed wireless network 104 is not in accord with the access policy, the access manager 404 terminates the access to the wireless network 104 and requests access to a wireless network in accord with the access policy.

At this time, when the access policy includes only wireless network SSID information, the access manager 404 requests the wireless network access module 400 to access a random wireless channel among wireless channels found in the SSID. On the other hand, when the access policy includes the SSID and an accessible frequency band, the access manager 404 requests the wireless network access module 400 to access a wireless channel in accord with the accessible frequency band in the SSID. Also, when there are a plurality of accessible SSIDs, the access manager 404 requests the wireless network access module 400 to access an SSID having the highest access priority order.

This will be described in further detail below.

First, when the SSID of the currently accessed wireless network 104 is not included in the access policy, the access manager 404 terminates the current access, and requests re-access from the wireless network access module 400 with reference to an SSID having the highest priority order among SSIDs included in the access policy and a frequency band mapped to the SSID.

When the SSID of the currently accessed wireless network 104 is included in the access policy, the access manager 404 determines whether a currently accessed radio frequency band is in accord with the access policy. When the radio frequency band is not in accord with the access policy, the access manager 404 terminates the current access, and then requests re-access to a frequency band included in the access policy for the same SSID.

When both the SSID and the accessed radio frequency band of the currently accessed wireless network 104 are in accord with the access policy, the access manager 404 maintains the current access as it is.

When an access termination request and a re-access request are received from the access manager 404, the wireless network access module 400 terminates the access to the currently accessed wireless network 104, and re-accesses a wireless network in accord with the access policy.

Meanwhile, when the wireless network access apparatus 102 moves from a current wireless network service area to another service area, the respective components of the wireless network access apparatus 102 download an access policy appropriate for the corresponding wireless network service area and a wireless network SSID in the same way as described above, and resets access to a wireless AP in the area accordingly.

The three exemplary embodiments described above may be implemented by a wireless network service provider (operator) for a user subscribing the service and the wireless network access apparatus 102 separately or in a combined manner.

Figure 5:
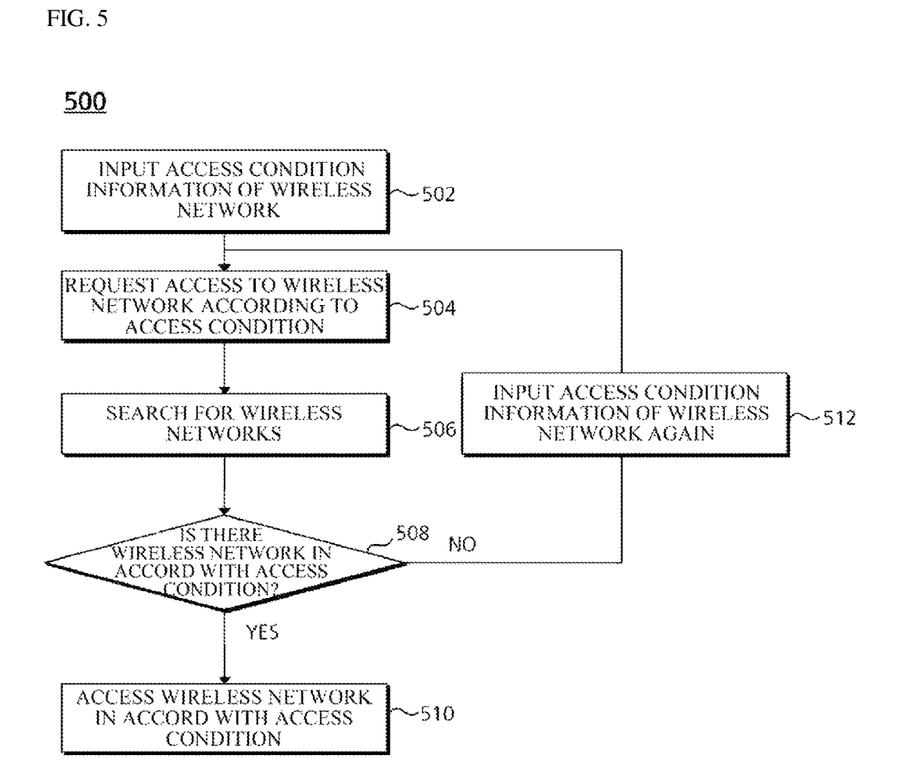
FIG. 5 is a flowchart illustrating a method of accessing a wireless network 500 according to the first exemplary embodiment of the present invention.

FIG. 5 is a flowchart illustrating a method of accessing a wireless network according to the first exemplary embodiment of the present invention.

First, the input unit 200 receives access condition information of a desired wireless network 104 from a user (502). Here, the access condition information may include only the SSID of the desired wireless network 104, or include the SSID together with desired frequency band information of the SSID.

Next, the access manager 202 requests wireless network access from the wireless network access module 204 according to the received access condition information (504).

Then, the wireless network access module 204 searches for wireless networks (506). When a search result indicates that there is a wireless network in accord with the access condition information, the wireless network access module 204 accesses the wireless network (508 and 510). For example, when the access condition information includes only an SSID, the wireless network access module 204 accesses wireless channels in all radio frequency bands served by the SSID. Also, when the access condition information includes the SSID together with a radio frequency band, the wireless network access module 204 searches for only wireless channels of the received radio frequency band in the received SSID and accesses a found wireless channel.

On the other hand, when the search result indicates that there is not any wireless network in accord with the access condition information, the access manager 202 outputs a wireless network access failure message to the user, and receives access information through the input unit 200 again (512).

Figure 6:
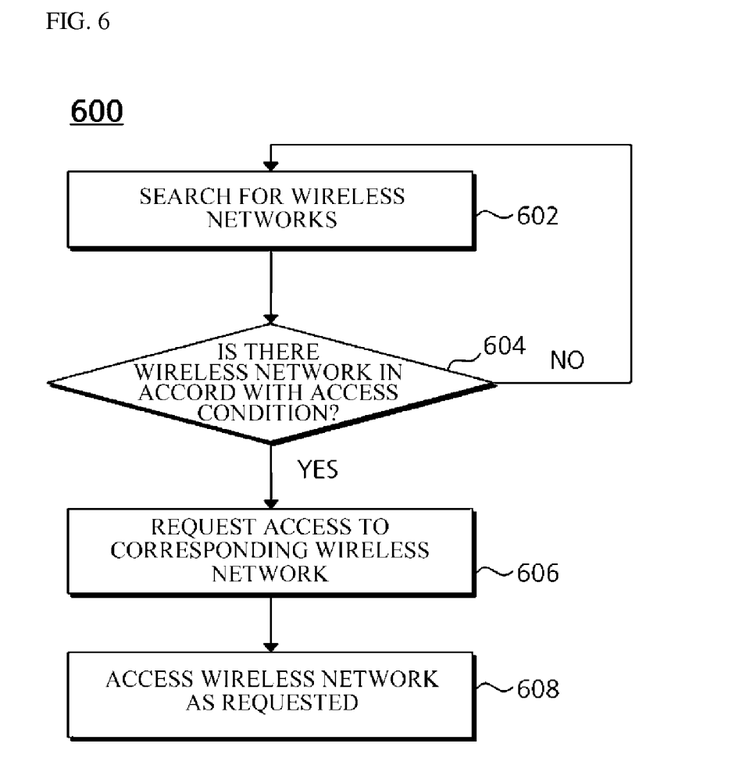
FIG. 6 is a flowchart illustrating a method of accessing a wireless network 600 according to the second exemplary embodiment of the present invention.

FIG. 6 is a flowchart illustrating a method of accessing a wireless network according to the second exemplary embodiment of the present invention.

First, the wireless network access module 302 searches for accessible wireless networks according to set periods or a request of the access manager 304, etc., and generates information on accessible wireless networks (602). Here, the accessible wireless network information includes the SSIDs and radio frequency bands of the accessible wireless networks.

Next, the access manager 304 compares the information on the accessible wireless networks found by the wireless network access module 302 with wireless network access condition information previously stored in the storage module 300 (604). When there is a wireless network in accord with access conditions, the access manager 304 requests the wireless network access module 302 to access the wireless network (606). Here, the wireless network access condition information includes at least one piece of information among the SSID of a desired wireless network, SSID-specific accessible radio frequency bands, accessible radio frequency bands of respective APs in the desired SSID, and SSID-specific access priority orders.

Operation 606 may be configured so that, when there is an accessible wireless network among the found wireless networks, the wireless network access module 302 is requested to access the wireless network. Also, operation 606 may be configured so that, when information on a radio frequency band mapped to the SSID of the desired wireless network is additionally included in the access condition information, the wireless network access module 302 is requested to access a wireless channel in accord with a desired radio frequency band in an accessible wireless network. Operation 606 may be configured so that, when the access condition information includes accessible radio frequency bands according to APs in the SSID of the desired wireless network, the wireless network access module 302 is requested to access a wireless channel having the SSID, an AP, and a radio frequency band all in accord with the access condition information. Also, operation 606 may be configured so that, when there are a plurality of desired SSIDs in accessible wireless networks, the wireless network access module 302 is requested to access an SSID having the highest access priority order.

Subsequently, the wireless network access module 302 accesses the wireless network as requested by the access manager 304 (608).

Meanwhile, when it is determined in operation 604 that there is not any appropriate SSID, the wireless network access module 302 continuously searches for wireless networks until an SSID in accord with the access conditions is found.

Figure 7:
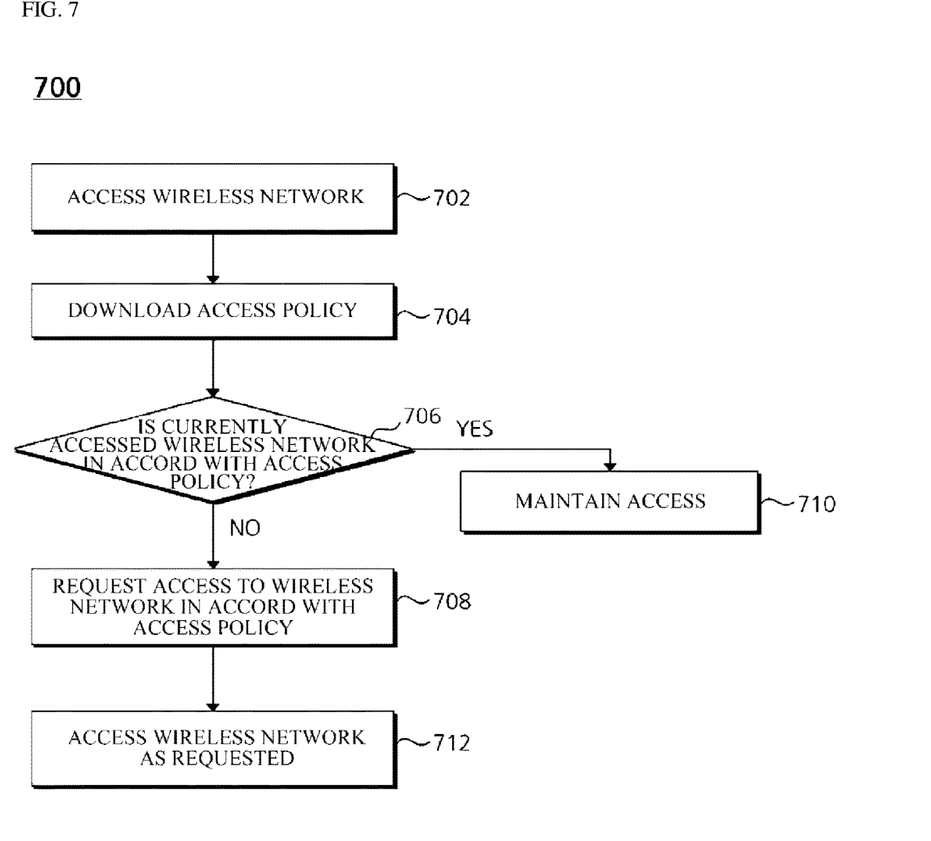
FIG. 7 is a flowchart illustrating a method of accessing a wireless network 700 according to the third exemplary embodiment of the present invention.

FIG. 7 is a flowchart illustrating a method of accessing a wireless network according to the third exemplary embodiment of the present invention.

First, the wireless network access module 400 searches for wireless networks and accesses one of found wireless networks (702).

Next, the policy download module 402 downloads an access policy of the accessed wireless network from the integrated management server 112 via the wireless network (704). Here, the access policy includes at least one among the SSIDs of wireless networks accessible by the wireless network access apparatus 102, SSID-specific accessible frequency bands, and SSID-specific access priority orders, and is determined in consideration of at least one piece of information among user information of the wireless network access apparatus 102, unique information of the wireless network access apparatus 102, information on a wireless network service area 114 accessed by the wireless network access apparatus 102, and an access time.

Next, the access manager 404 compares the downloaded access policy with information on a currently accessed wireless network (706). Here, the information of the wireless network includes SSID and radio frequency band information of the currently accessed wireless network.

Subsequently, when it is determined that the currently accessed wireless network is not in accord with the access policy as a result of the comparison, the access manager 404 terminates the access to the currently accessed wireless network and requests access to a wireless network in accord with the access policy and the corresponding radio frequency band (708). On the other hand, when the currently accessed wireless network is in accord with the access policy, the access manager 404 maintains the current access (710).

Specifically, in operation 708, when there is an SSID identical to an accessible SSID among the wireless networks found by the wireless network access module 400, the access manager 404 requests the wireless network access module 400 to access the SSID. Also, when the access policy includes the accessible SSIDs and radio frequency band information of the SSIDs, operation 708 may be configured to request the wireless network access module 400 to access a wireless channel in accord with an accessible radio frequency band among SSIDs in accord with accessible wireless networks. Further, in operation 708, when there are a plurality of accessible SSIDs among access-permitted SSIDs included in the access policy, the wireless network access module 400 may be requested to access an SSID having the highest access priority order among the plurality of SSIDs.

Finally, the wireless network access module 400 accesses an SSID as requested by the access manager 404 and a wireless channel in the corresponding radio frequency band (712).

Meanwhile an exemplary embodiment of the present invention can include a computer-readable recording medium including a program for causing a computer system to execute the methods described herein. The computer-readable recording medium can include a program command, a local data file, a data structure, etc., solely or in a combined manner. The computer-readable recording medium may be specially designed and configured for the present invention, or known and available to those of ordinary skill in the field of computer software. Examples of the computer-readable recording medium include magnetic media, such as a hard disk, a floppy disk, and a magnetic tape, optical recording media, such as a compact disc read-only memory (CD-ROM) and a digital versatile disc (DVD), magneto-optical media, such as a floptical disk, and hardware devices, such as a ROM, a random access memory (RAM), and a flash memory, specially configured to store and execute program commands. Examples of the program commands may include high-level language codes executable by a computer using an interpreter, etc., as well as machine language codes made by compilers.

Although the present invention has been described through exemplary embodiments, it shall be appreciated that various permutations and modifications of the described embodiments are possible by those of ordinary skill in the art to which the present invention pertains without departing from the scope of the invention.

Therefore, the scope of the present invention shall not be defined by the described embodiments but shall be defined by the appended claims and their equivalents.

What is claimed is:

1. An apparatus for accessing a wireless network, the apparatus comprising:

an access manager configured to request access to a wireless network according to a wireless network access condition including at least one desired service set identifier (SSID); and a wireless network access module configured to search for at least one wireless network corresponding to the at least one desired SSID, and access the searched at least one wireless network, wherein the access manager and the wireless network access module are implemented via at least one central processing unit (CPU) or at least one hardware processor, wherein the wireless network access condition further includes at least one of information on a desired radio frequency band of a wireless network corresponding to a desired SSID and information on a desired radio frequency band of an access point (AP) in the wireless network corresponding to the desired SSID, wherein the wireless network access module is configured to access at least one of the desired radio frequency band of the wireless network corresponding to the desired SSID and the desired radio frequency band of the AP in the wireless network corresponding to the desired SSID, and wherein the wireless network access module is configured to set a wireless channel scanning range of a wireless communication modem included in the wireless network access module so that the wireless communication modem scans only a wireless channel of the desired radio frequency band.

2. The apparatus of claim 1, further comprising an input unit configured to receive the wireless network access condition from a user.

3. The apparatus of claim 1,
wherein the wireless network access module is configured to reset the wireless channel scanning range of the wireless communication modem so that the wireless communication modem scans all of wireless channels of radio frequency bands accessible by the wireless communication modem when access to a currently accessed wireless network is terminated.

4. The apparatus of claim 1, wherein, when the wireless network access condition includes a plurality of desired SSIDs, the wireless network access condition further includes access priority orders among the plurality of desired SSIDs, and when the wireless network access module searches a plurality of wireless networks corresponding to the plurality of desired SSIDs, the wireless network access module is configured to access a wireless network corresponding to a desired SSID having a highest access priority order among the plurality of wireless networks.

5. An apparatus for accessing a wireless network, the apparatus comprising:
a wireless network access module configured to search for wireless networks and access a wireless network among the searched wireless networks;
a policy download module configured to download a wireless network access policy via the accessed wireless network; and
an access manager configured to compare the downloaded wireless network access policy with information on a currently accessed wireless network, and based on a result of the comparison, terminate access to the currently accessed wireless network and request access to another wireless network based on the access policy, wherein the wireless network access module is configured to access the another wireless network requested by the access manager, wherein the wireless network access module, the policy download module, and the access manager are implemented via at least one central processing unit (CPU) or at least one hardware processor, wherein, when a plurality of wireless networks are accessible by the apparatus, the wireless network access policy include service set identifiers (SSIDs) of the plurality of accessible wireless networks and accessible radio frequency bands corresponding to the SSIDs, wherein the wireless network access module is configured to access a wireless network corresponding to an SSID of an accessible wireless network among the searched wireless networks, wherein the wireless network access module is configured to access an accessible radio frequency band of the wireless network corresponding to the SSID of the accessible wireless network, and wherein the wireless network access module is configured to set a wireless channel scanning range of a wireless communication modem included in the wireless network access module so that the wireless communication modem scans only a wireless channel of the desired radio frequency band.

6. The apparatus of claim 5, wherein the wireless network information includes at least one from among a service set identifier (SSID) and a radio frequency band of the currently accessed wireless network.

7. The apparatus of claim 5, wherein, when a plurality of wireless networks are accessible by the apparatus, the wireless network access policy further includes access priority orders of the SSIDs.

8. The apparatus of claim 7,
wherein the wireless network access module is configured to reset the wireless channel scanning range of the wireless communication modem so that the wireless communication modem scans all of wireless channels of radio frequency bands accessible by the wireless communication modem when access to the currently accessed wireless network is terminated.

9. The apparatus of claim 7, wherein, when a plurality of wireless networks correspond to the SSIDs of the plurality of accessible wireless networks, the wireless network access module is configured to access a wireless network corresponding to an SSID having a highest access priority order among the plurality of wireless networks.

10. The apparatus of claim 5, wherein the wireless network access policy is determined based on at least one from among user information of the apparatus, unique information of the apparatus, information on a wireless network service area accessed by the apparatus, and an access time.

11. A method of accessing a wireless network by using a wireless network access apparatus comprising an access manager and a wireless network access module, the method comprising:
requesting, by the access manager, access to a wireless network according to a wireless network access condition including at least one desired service set identifier (SSID); and
searching for, by the wireless network access module, at least one wireless network corresponding to the at least one desired SSID, and accessing the searched at least one wireless network,
wherein the wireless network access condition further includes at least one of information on a desired radio frequency band of a wireless network corresponding to a desired SSID and information on a desired radio frequency band of an access point (AP) in the wireless network corresponding to the desired SSID, wherein the accessing to the wireless network comprises accessing at least one of the desired radio frequency band of the wireless network corresponding to the desired SSID and the desired radio frequency band of the AP in the wireless network corresponding to the desired SSID, and wherein the wireless network access module is configured to set a wireless channel scanning range of a wireless communication modem included in the wireless network access module so that the wireless communication modem scans only a wireless channel of the desired radio frequency band.

12. The method of claim 11, further comprising receiving, by an input unit of the wireless network access apparatus, the wireless network access condition from a user.

13. The method of claim 11, wherein, when the wireless network access condition includes a plurality of desired SSIDs, the wireless network access condition further includes access priority orders among the plurality of desired SSIDs, and when a plurality of wireless networks corresponding to the plurality of desired SSIDs are searched, the accessing to the wireless network comprises accessing a wireless network corresponding to a desired SSID having a highest access priority order among the plurality of wireless networks.

14. A non-transitory computer-readable recording medium storing a program comprising program instructions which, when executed by a computer, cause the computer to perform the method of claim 11.

15. A method of accessing a wireless network by using a wireless network access apparatus comprising a wireless network access module, a policy download module, and an access manager, the method comprising:

searching for, by the wireless network access module, wireless networks and accessing a wireless network among the searched wireless networks;

downloading, by the policy download module, a wireless network access policy via the accessed wireless network;

comparing, by the access manager, the downloaded wireless network access policy with information on a currently accessed wireless network, and based on a result of the comparison, terminating access to the currently accessed wireless network and requesting access to another wireless network based on the access policy; and accessing, by the wireless network access module, the another wireless network requested by the access manager, wherein, when a plurality of wireless networks are accessible by the apparatus, the wireless network access policy include service set identifiers (SSIDs) of the plurality of accessible wireless networks and accessible radio frequency bands corresponding to the SSIDs, wherein the accessing the wireless network comprises accessing a wireless network corresponding to an SSID of an accessible wireless network among the searched wireless networks, wherein the accessing the wireless network comprises accessing an accessible radio frequency band of the wireless network corresponding to the SSID of the accessible wireless network, and wherein the wireless network access module is configured to set a wireless channel scanning range of a wireless communication modem included in the wireless network access module so that the wireless communication modem scans only a wireless channel of the desired radio frequency band.

16. The method of claim 15, wherein the wireless network information includes at least one from among a service set identifier (SSID) and a radio frequency band of the currently accessed wireless network.

17. The method of claim 15, wherein, when a plurality of wireless networks are accessible by the apparatus, the wireless network access policy further includes access priority orders of the SSIDs.

18. The method of claim 17, wherein the accessing the wireless network comprises, when a plurality of wireless networks correspond to the SSIDs of the plurality of accessible wireless networks, accessing a wireless network corresponding to an SSID having a highest access priority order among the plurality of wireless networks.

19. The method of claim 15, wherein the wireless network access policy is determined based on at least one from among user information of the wireless network access apparatus, unique information of the wireless network access apparatus, information on a wireless network service area accessed by the wireless network access apparatus, and an access time.

20. A non-transitory computer-readable recording medium storing a program comprising program instructions which, when executed by a computer, cause the computer to perform the method of claim 15.

* * * * *